United States Patent
Hedbom et al.

(10) Patent No.: US 11,995,074 B2
(45) Date of Patent: *May 28, 2024

(54) COMPUTING ARRANGEMENT AND METHOD FOR DETERMINING RELATIONSHIPS BETWEEN IDENTITY DATA

(71) Applicant: KING.COM LIMITED, St. Julians (MT)

(72) Inventors: Jan-Erik Hedbom, Stockholm (SE); Mattias Andersson, Stockholm (SE)

(73) Assignee: KING.COM LIMITED, St. Julians (MT)

( * ) Notice: Subject to any disclaimer, the term of this patent is extended or adjusted under 35 U.S.C. 154(b) by 0 days.

This patent is subject to a terminal disclaimer.

(21) Appl. No.: 18/117,078

(22) Filed: Mar. 3, 2023

(65) Prior Publication Data

US 2023/0205768 A1 Jun. 29, 2023

Related U.S. Application Data

(63) Continuation of application No. 17/176,376, filed on Feb. 16, 2021, now Pat. No. 11,599,534.

(51) Int. Cl.
*G06F 16/245* (2019.01)
*G06F 16/27* (2019.01)

(52) U.S. Cl.
CPC .......... *G06F 16/245* (2019.01); *G06F 16/278* (2019.01)

(58) Field of Classification Search
CPC ...... G06F 16/245; G06F 16/27; G06F 16/278; G06F 16/901; G06F 16/9024; G06F 16/906
See application file for complete search history.

(56) References Cited

U.S. PATENT DOCUMENTS

| | | | |
|---|---|---|---|
| 7,403,942 B1 | 7/2008 | Bayliss | |
| 9,703,845 B2* | 7/2017 | Iesiev | G06F 16/248 |
| 11,182,687 B1 | 11/2021 | Blumenfeld et al. | |
| 2009/0260016 A1 | 10/2009 | Ramakrishnan et al. | |
| 2015/0051988 A1 | 2/2015 | Chen | |
| 2015/0375122 A1 | 12/2015 | Stymne et al. | |
| 2017/0109855 A1* | 4/2017 | Stockton | G06Q 50/265 |
| 2017/0116339 A1* | 4/2017 | Stein | G06F 16/24578 |

(Continued)

FOREIGN PATENT DOCUMENTS

CN 110826605 A 2/2020

*Primary Examiner* — James E Richardson
(74) *Attorney, Agent, or Firm* — Saul Ewing LLP

(57) ABSTRACT

A computing arrangement receives data. The data is from computer apps running on computer devices. The data has user identity data and associated device identity data. A memory stores sets of identity data. A respective set of identity data is associated with a user identity. Sets of identity data comprise at least one user identity data, at least one device entity data and information defining a connection relationship between the identity data of the respective set of identity data. At least one processor determines in response to received user identity data and device identity data that a first stored set of identity data is to be divided into two or more sets of user identity data. At least two sets of user identity data are associated with different user identities. The set of identity data is divided in dependence on the information defining the connection relationships.

20 Claims, 15 Drawing Sheets

(56) References Cited

U.S. PATENT DOCUMENTS

| | | |
|---|---|---|
| 2017/0180506 A1 | 6/2017 | Ren |
| 2018/0316665 A1 | 11/2018 | Caldera et al. |
| 2020/0104408 A1* | 4/2020 | Salomon ............... G06F 16/285 |
| 2020/0134497 A1* | 4/2020 | Salomon ............... G06N 20/00 |

* cited by examiner

COMPUTING ARRANGEMENT AND METHOD FOR DETERMINING RELATIONSHIPS BETWEEN IDENTITY DATA

CROSS-REFERENCE TO RELATED APPLICATIONS

This application is a continuation of U.S. application Ser. No. 17/176,376, filed Feb. 16, 2021, the entire contents of which being fully incorporated herein by reference.

FIELD OF THE INVENTION

Some embodiments may relate to a computing arrangement or device configured to determine relationships between different identity data. Some embodiments relate to a method implemented by a computing device or arrangement configured to determine relationships between different identity data.

BACKGROUND OF THE INVENTION

The modern world is becoming a ubiquitous connected world, with users registered, or not, with certain services. Such services may require unique login and password information, and as is becoming increasingly familiar to the users, they may have to manage many such accounts for various services.

A user may have several devices, or indeed points of access to, in the user's view, the same application. This is particularly relevant to social gaming applications, where a user or player may register once (via a laptop for example), play the same game application via a social networking platform and/or on another device of the user (e.g. smartphone, tablet, google glass).

Thus, some users may have two or more different accounts for the same game application. This may occur in the world of social media, where users may play games, on such social platforms in addition to playing the same games offered by the service provider on the service provider's platform.

Some users may have different accounts for different games.

Some devices may be used by more than one person. For example, different family members may use a common computer device.

It is a technical challenge to determine which one or more identities can be associated with one or more other identities.

SUMMARY OF THE INVENTION

According to one aspect, there is provided a computing arrangement, the computing arrangement configured to determine relationships between identity data, the computing arrangement comprising: an input configured to receive data, the data being provided by one or more computer apps running on one or more computer devices, the data comprising user identity data and associated device identity data; at least one memory configured to store a plurality of sets of identity data, a respective set of identity data being associated with a user identity, wherein at least some of the sets of identity data comprise at least one user identity data, at least one device entity data and information defining a connection relationship between the identity data of the respective set of identity data; and at least one processor configured to determine in response to received user identity data and device identity data that a first stored set of identity data is to be divided into two or more sets of user identity data, at least two of the two or more sets of user identity data being associated with different user identities, the at least one processor being configured to divide the first stored set of identity data in dependence on the information defining the connection relationships.

The at least one processor may be configured to use the information defining the connection relationship to determine a connection distance between one user identity data and at least one other identity data of the first stored set and to divide the stored set of identity data in dependence on the connection determined distance.

The at least one processor may be configured to determine that the first stored set of identity data comprises a plurality of identities of a first type and in response to divide the first stored set of identity data such that the plurality of identities of the first type are provided in respective different ones of the two or more different sets of user identity data.

The first type of identity may comprise a strong identity.

When new identity data is received, the at least one processor may be configured to determine if the new identity data is to be added to one of the stored plurality of sets of identity data or if the new identity data is to be added to a new set of identity data.

When new identity data is received, the at least one processor may be configured to determine which one of the stored plurality of sets of identity data the new identity data is to be added.

When the new identity data is received with identity data which has previously been received, the at least one processor may be configured to provide a connection relationship between the new identity data and the identity data which have previously been received.

The at least one processor may be configured to determine one or more candidate ones of the plurality of sets of data to which the new identity data is to be added.

The at least one processor may be configured to determine a type of the new identity data and in dependence on the determined type of the new identity data, select one of the candidate ones of the plurality of sets of data.

The at least one processor may be configured to select one of the candidate ones of the plurality of sets of data in dependence on a connection distance determined using the information defining connection relationships between an identity of a given type in a respective candidate one of the plurality of sets of identity data and the new identity data.

Each identity data may be represented programmatically by a node with one or more connections provided between nodes representing a respective connection relation ship The at least one processor may be configured to determine when the number of identity data in a set of the plurality of sets of data has reached a threshold number and in response to divide that set into two or more sets of identity data.

The at least one processor may be configured to determine when a distance between two identities in one of the set of identities is greater than a threshold distance defined by a plurality of connection relationships, and in response to divide that set into two or more sets of identity data.

The one or more computer apps may comprise one or more computer game apps.

At least one some of the identity data may be associated with an account to play one or more of the computer game apps, the at least one processor being configured to link together accounts which are associated with identities in a same one of the plurality of sets of identity data.

The computing arrangement may be provided by a computer device or by two or more computer devices.

According to another aspect, there is provided a computer implemented method provided by a computing arrangement, the computing arrangement configured to determine relationships between identity data, the computing arrangement comprising an input, at least one memory and at least one processor which are configured to provide the method which comprises: receiving data by the input, the data being provided by one or more computer apps running on one or more computer devices, the data comprising user identity data and associated device identity data; storing by the at least one memory a plurality of sets of identity data, a respective set of identity data being associated with a user identity, wherein at least some of the sets of identity data comprise at least one user identity data, at least one device entity data and information defining a connection relationship between the identity data of the respective set of identity data; determining by the at least one processor in response to received user identity data and device identity data that a first stored set of identity data is to be divided into two or more sets of user identity data, at least two of the two or more sets of user identity data being associated with different user identities; and dividing by the at least one processor the first stored set of identity data in dependence on the information defining the connection relationships.

The method may comprise using by the at least one processor the information defining the connection relationship to determine a connection distance between one user identity data and at least one other identity data of the first stored set and dividing by the at least one processor the stored set of identity data in dependence on the connection determined distance.

The method may comprise determining by the at least one processor that the first stored set of identity data comprises a plurality of identities of a first type and in response dividing by the at least one processor the first stored set of identity data such that the plurality of identities of the first type are provided in respective different ones of the two or more different sets of user identity data.

The first type of identity may comprise a strong identity.

When new identity data is received, the method may comprise determining by the at least one processor if the new identity data is to be added to one of the stored plurality of sets of identity data or if the new identity data is to be added to a new set of identity data.

When new identity data is received, the method may comprise determining by the at least one processor which one of the stored plurality of sets of identity data the new identity data is to be added.

When the new identity data is received with identity data which has previously been received, the method may comprise providing by the at least one processor a connection relationship between the new identity data and the identity data which have previously been received.

The at least one processor may be configured to determine one or more candidate ones of the plurality of sets of data to which the new identity data is to be added.

The method may comprise determining by the at least one processor a type of the new identity data and in dependence on the determined type of the new identity data, selecting by the at least one processor one of the candidate ones of the plurality of sets of data.

The method may comprise selecting by the at least one processor one of the candidate ones of the plurality of sets of data in dependence on a connection distance determined using the information defining connection relationships between an identity of a given type in a respective candidate one of the plurality of sets of identity data and the new identity data.

Each identity data may be represented programmatically by a node with one or more connections provided between nodes representing a respective connection relation ship The method may comprise determining by the at least one processor when the number of identity data in a set of the plurality of sets of data has reached a threshold number and in response dividing by the at least one processor that set into two or more sets of identity data.

The method may comprise determining by the at least one processor when a distance between two identities in one of the set of identities is greater than a threshold distance defined by a plurality of connection relationships, and in response dividing by the at least one processor that set into two or more sets of identity data.

The one or more computer apps may comprise one or more computer game apps.

At least one some of the identity data may be associated with an account to play one or more of the computer game apps, and the method comprises linking by the at accounts which are associated with identities in a same one of the plurality of sets of identity data.

According to another aspect, there is provided a non-transitory computer readable storage device storing instructions that, when executed by at least one processor of computing arrangement comprising at least one memory, the at least one processor, and an input causes the computing arrangement to be configured to determine relationships between identity data, the at least one processor being configured to perform the following steps: causing the input to receive data, the data being provided by one or more computer apps running on one or more computer devices, the data comprising user identity data and associated device identity data; causing the at least one memory to store a plurality of sets of identity data, a respective set of identity data being associated with a user identity, wherein at least some of the sets of identity data comprise at least one user identity data, at least one device entity data and information defining a connection relationship between the identity data of the respective set of identity data; determining in response to received user identity data and device identity data that a first stored set of identity data is to be divided into two or more sets of user identity data, at least two of the two or more sets of user identity data being associated with different user identities: and dividing the first stored set of identity data in dependence on the information defining the connection relationships.

According to another aspect, there is provided a non-transitory computer readable storage device storing instructions that, when executed by at least one processor of a computer arrangement causes the at least one processor to provide the method of embodiments.

According to some aspects, there is provided a program product comprising a computer-readable storage device including a computer-readable program, wherein the computer-readable program when executed on a computer causes the computer to perform any one or more of the method steps described previously.

A computer program comprising program code means adapted to perform the method(s) may be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF DRAWINGS

To understand some embodiments, reference will now be made by way of example only to the accompanying drawings, in which:

FIG. 4b shows a combined set of nodes for the identities of FIG. 4a;

FIG. 5b shows a modification to the set of nodes of FIG. 5b to add the two further identities to the set of nodes for the two identities of FIG. 5a;

FIG. 5d shows a modification to the set of nodes of FIG. 5c to add a further identity and modify the set of nodes of the two identities of FIG. 5a;

DETAILED DESCRIPTION OF SOME EMBODIMENTS

Figure 1:
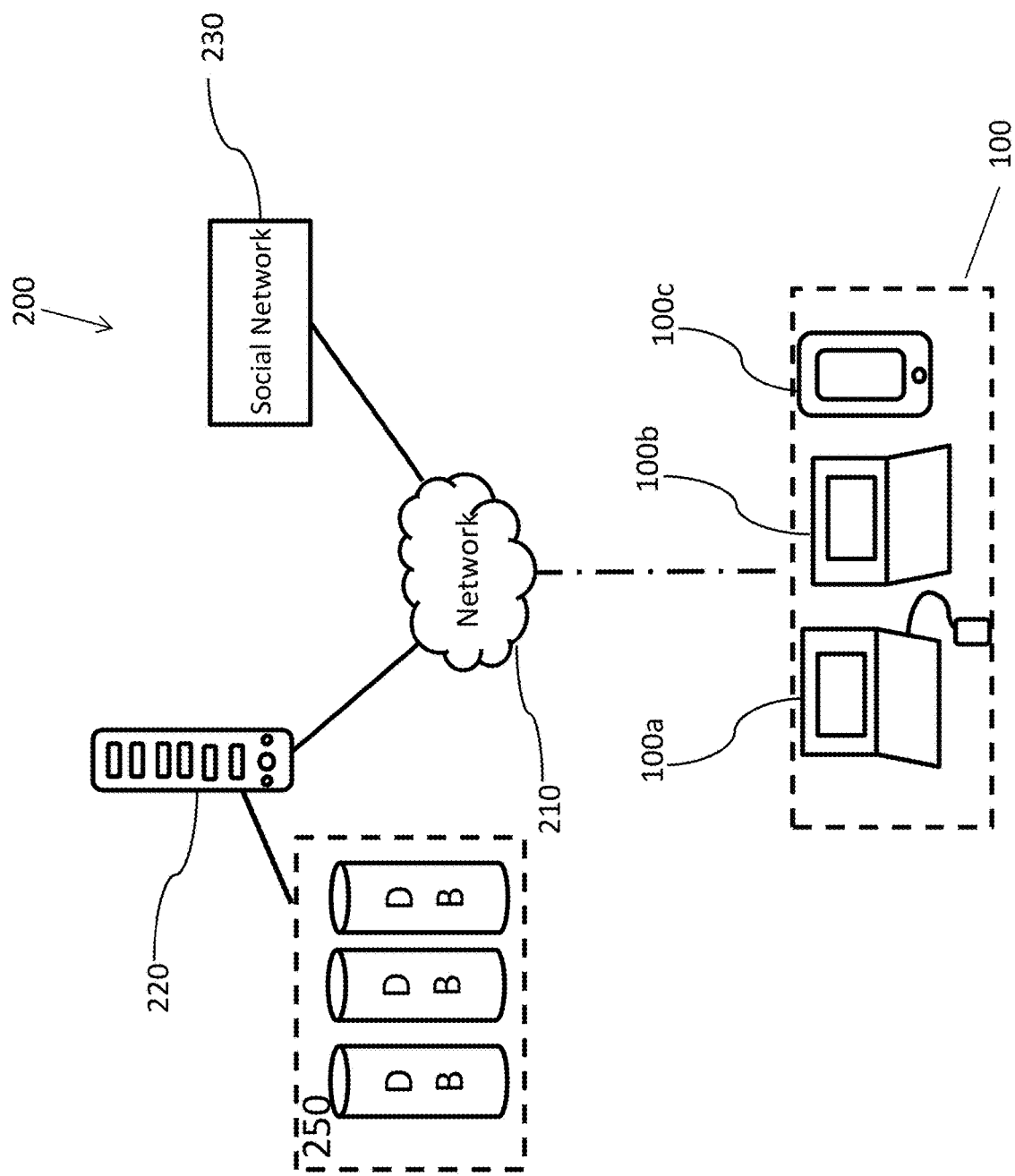
FIG. 1 illustrates an example system in which some embodiments may be provided.

FIG. 1 schematically shows a system 200 in some embodiments. The system 200 comprises one or more servers 220 which may store or be in communication with one or more databases 250. The database may store data. In practice, more than one database 250 may be provided.

In some embodiments, the one or more databases may be provided by a plurality of databases.

In some embodiments, the database may be provided by a database farm or warehouse.

Where a plurality of databases 250 are provided, the plurality of databases may be located in the same location, and/or maybe physically distant from each other as will be recognised by those skilled in the art.

In some embodiments, where more than one server 220 is provided, the database(s) 250 may be provided across two or more servers 220.

The server 220 may communicate via for instance the internet 210 to one or more client or user devices 100, shown in FIG. 1 by way of example as user devices 100a, 100b and 100c.

In some embodiments, the server and/or one or more user devices may be connected to a social network 230 such as Facebook™ and/or the like. The connection may be via the network 210 and/or via any other suitable connection. The server 220 may alternatively or additionally have a game data function.

The user devices may be running one or more computer apps or computer programs. The one or more computer apps or programs may be any suitable computer apps or programs. In some embodiments, the computer apps may be computer game apps or any other suitable app. In the following examples, the computer apps are computer games. However, this is by way of example only and other embodiments may be used with any suitable computer program or app.

The at least one server may comprise one or more units of memory to store the computer program and/or user behaviour data. Alternatively or additionally, the at least one server may have at least one processor to run the program and/or process the user behaviour data.

Casual or social gaming is one example where computer apps are used. Candy Crush Saga, Candy Crush Soda Saga, Pet Rescue Saga, Farm Heroes Saga, and Bubble Witch Saga are some examples of the applicant's games that are incredibly popular with millions of users worldwide.

Such games may be made available across different platforms. For example, a user may play via a website using any suitable device such as a desktop PC, laptop, tablet, or smartphone.

A user may alternatively or additionally play on the same device or different devices via a social network such as Facebook™ or Google+. This may for example, be via the internet.

A user may use more than one device (for example, a smart phone, a tablet, PC, or laptop) to access the same or different applications on the same or different platform.

An anonymous account may be enabled if the user wishes to play directly with the service provider. This may be provided on a per game basis in some embodiments.

Alternatively or additionally, the user may have an account which allows the user to access one or more games. The account will be specific to the user and will have user identity information and optionally a password.

The user identity information may be an email address and/or other form of identity information.

The user may play the game via a social media site or the like. In the case of Facebook™, the user identity information will be the Facebook identity.

Different users may have access to a common computer device. For example, different family members may use a common computer device.

When a user uses a computer app, data associated with the computer app will be sent from the respective user device to a server.

When a user plays a game, the user will have an ID. This ID may be a so-called weak ID or a so-called strong ID.

A strong ID will be an identity such as an email address or a Facebook identity. A strong identity may be regarded as an identity of the user. The user may have used this strong ID when the user has created an account with the computer app provider. The strong ID may be one which is created by the user, for example by creating an account or used by the user to create an account. The strong ID may be a user registered ID.

A weak ID will be an ID which is allocated by the computer app provider. This may be when the user downloads an app. The user may not be required to register and is instead allocated an identity by a server supporting the computer app.

When a user uses an app, the ID (which may be weak or strong) may be provided with the server along with a device ID. The device ID which is provided may or may not be unique. In some situations, more than one device ID may be provided.

Figure 2:
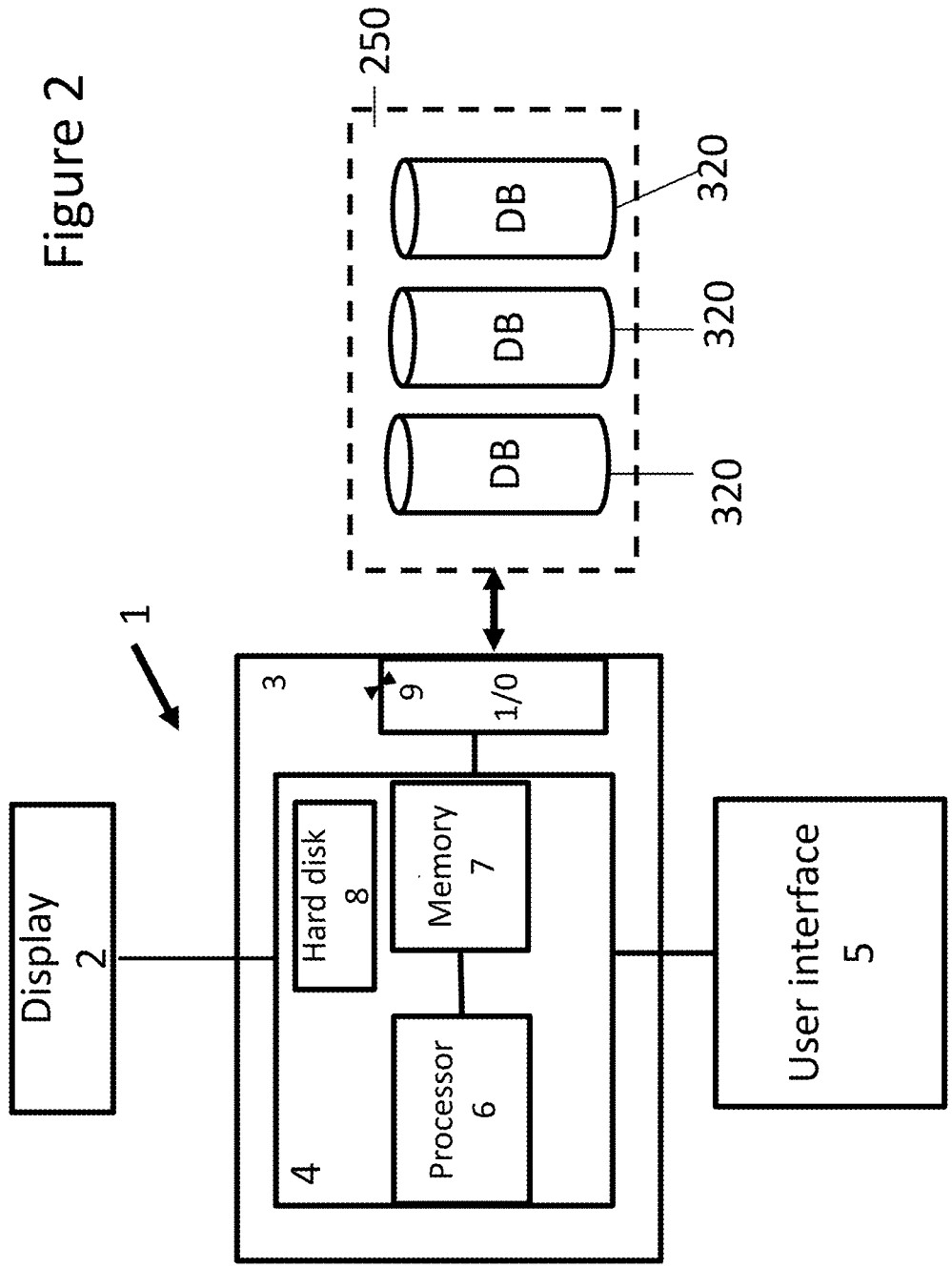
FIG. 2 shows more detail of an example computing arrangement configured to provide one or more embodiments.

Reference is made to FIG. 2 which schematically shows a computing arrangement 1 in which embodiments may be provided. The computer arrangement is configured to implement one or more different embodiments. In this example, the computing arrangement may be a computing device, PC, laptop, server, or the like. The computing device may be the server 220 of FIG. 1 or a different device.

The computer arrangement may alternatively be provided by a plurality of computing devices. By way of examples, some embodiments may be implemented by a bank of servers or a server farm.

The computing arrangement comprises a computing part 3 which comprises a computer processing part 4. The computer processing part 4 may in some embodiments be provided at least partially by one or more CPUs (central processing unit). This computer processing part 3 may comprise one or more processors 6 along with one or more memories 7. The one or more memories 7 may comprise random access memory, in some embodiments.

The computing part 3 may have an input/output interface 9 which allows the computing arrangement 1 to be connected for example to the database or database arrangement 250 directly or via a network or via one or more other devices. In some embodiments, the computing part may be configured to be connected to the server instead of or in addition to the database or database arrangement. In some embodiments, the computing part may be provided in or by the server 220 of FIG. 1.

The input/output interface 9 may be for a wired and/or wireless connection.

In this embodiment, a hard disk drive 8 or other similar data storage may be provided. In other embodiments, a hard disk drive or other data storage may alternatively or additionally be provided on a different device.

The computing arrangement 1 may have a display 2 coupled to the computing part 3. The display 2 is, in some embodiments, driven by the computing part 3.

The computing arrangement may comprise a user interface 5. That user interface can be any suitable interface such as a keyboard and/or a user touch screen. In some embodiments, the user interface may comprise a mouse or other pointing device.

To illustrate some embodiments, a node based representation is used to show the relationship between identity data provided by the user devices when computer apps are being run on the respective user devices. In some embodiments, the data may be stored in the form of the node-based representation. In other embodiments, the identity data may be stored in sets of identity data with relationship data indicating the relationship between one or more of the identity data. The programming used by the computing arrangement may use a node representation or an equivalent representation.

Figure 3:
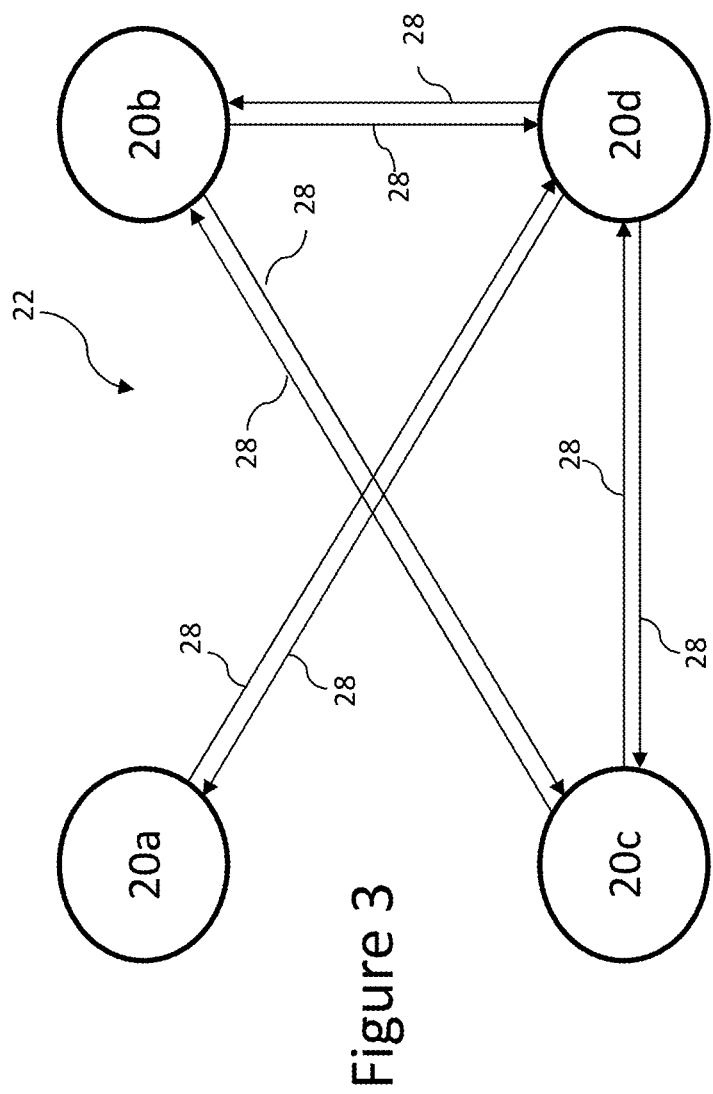
FIG. 3 illustrates a set of nodes representation used in some embodiments.

Reference is made to FIG. 3 which schematically shows an example node representation 22. The node representation comprises a plurality of nodes. In the example shown in FIG. 3 there are four nodes 20a, 20b, 20bc and 20d.

A node is connected to one or more other nodes by connections 28. Generally, there is a connection from a first node to a second node and a connection from the second node to the first node. Each node represents an identity and each connection between two nodes indicates an association between the identities of the respective nodes.

In some embodiments, identity data provided by one or more apps running on a plurality of user devices is used to create a plurality of sets of nodes or identity data. Each set of nodes is considered to have related identities and these related identities are considered to be associated with a single user.

The computing arrangement is configured to process the data to determine which identities can be associated with one another.

In some embodiments, this processing may be done on the fly so that every time new data is received, an update may be carried out. This means that the sets of data can be updated. For example, a set of data may be broken up into two or more sets of data. A new identity may be added to a set of data.

In other embodiments, the processing may be done depending on data which is stored in a data warehouse or the like. In this case, time data such as a time stamp may be used to control the order in which the data is processed. This is however optional in some embodiments.

The data may be processed to determine which identities are linked. The identity may be a device identity or a user identity. The user identity may be a strong identity or a weak identity as set out previously. In some embodiments, a weak identity may be associated with a strong identity. For example, a user may be playing a game using a weak identity and may make a Facebook™ connect request while playing the game. This would allow the weak identity to be associated with the strong Facebook™ identity.

Thus, in some embodiments, the programming of the computer arrangement is such that it implements the following or an equivalent non node based implementation. When a node is added, that node will receive suggestions for an ID from all the neighbouring nodes (the nodes that have a connection to the node in question). Those suggestions are compared, and a winner is selected. This winner is then sent out to all neighbouring nodes as a suggested ID. The suggestions include a complete list of nodes the ID has been sent via. This enables a comparison of the distance the ID has traversed, and to avoid infinite loops where IDs propagate in circles in the set of nodes. The rule for selecting the winning ID is as follows:

Is there is any strong ID among the suggestions. If there is a unique closest (by distance in the graph) such strong ID, that ID is selected. Otherwise, the nodes own ID (defined for user nodes, null for connect/device nodes) is selected.

If there is not any strong ID among the suggestions, the lowest value ID is selected.

Some examples will now be described.

Figure 4A:
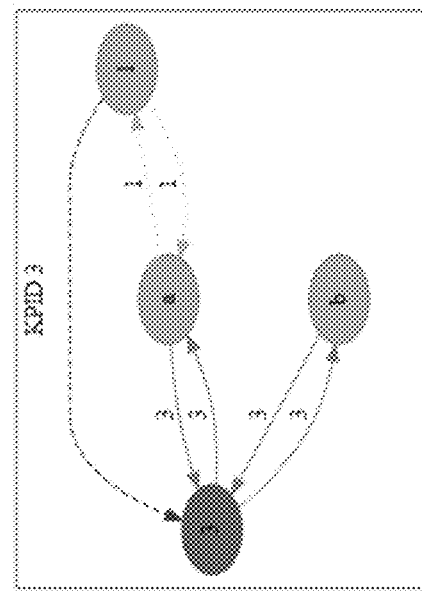
FIG. 4a shows sets of nodes for two identities.
Figure 4B:
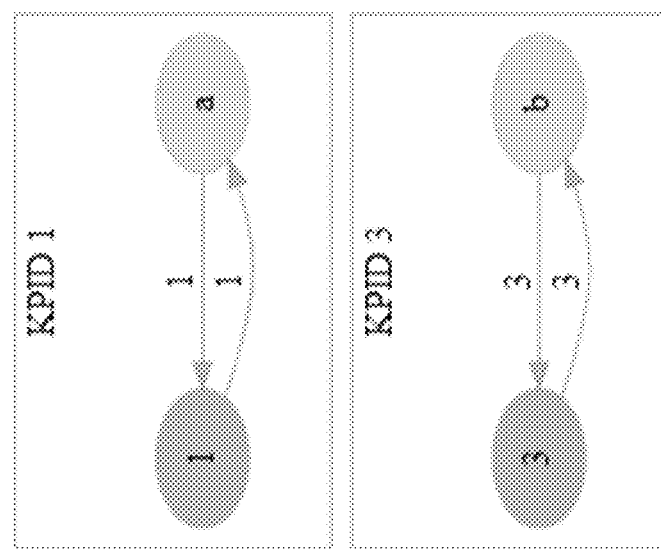

Reference is made to FIGS. 4a and 4b.

In FIG. 4a, a node for user ID 1 is connected to a node for device ID a. These two identities are associated with a single user identity which is referred to as KPID 1.

There is a connection from the node for user ID 1 to the node for device ID a. This connection is associated with the user identity ID 1. There is also a connection from the node for device ID a to the node for user ID 1. This connection is also associated with the user identity ID 1.

In FIG. 4a, a user ID 3 is associated with device ID b. These two identities are associated with a single user identity which is referred to as KPID 3. There is a connection from the node for user ID 3 to the node for device ID b. This connection is associated with the user identity ID 3. There is also a connection from the node for device ID b to the node for user ID 3. This connection is also associated with the user ID 3.

Thus, in FIG. 4a, there are two user IDs, KIPID 1 and KPID3. In this example, user ID 1 may be a weak identity and the user ID 3 may be a strong identity. All connections between the nodes within a set of nodes associated with an ID will have that same ID. Thus, all the connections between the nodes within the set of nodes associated with the first ID KPID1 are associated with the ID 1. All the connections between the nodes associated with the third ID KPID3 are associated with the ID 3.

In FIG. 4b, one or more event occurs which allows a determination to be made that the identities KPID 1 and KPID 3 are associated with the same user. The computer arrangement is configured to update the nodes of FIG. 4a to provide the set of nodes of FIG. 4b where the user identities are merged to a single identity. In this example, the user identities are merged to the single identity KPID 3 which is the strong identity. The set of nodes for the first user identity KPID 1 and the third user identity KPID 3 are thus merged and updated. The merged set of nodes has a first node with user ID 3. The nodes that were connected with the weak ID, ID 1 are now connected to the node associated with the strong ID, ID 3. The connections to the weak ID are removed.

There is a connection from the first node for user ID 3 to a node for device ID b. This connection is associated with the user identity ID 3. There is also a connection from the node for device ID b to the node for user ID 3. This connection is also associated with the user ID 3.

There is now connection from the first node for user ID 3 to a node for device ID a. This connection is associated with the user identity ID 3. There is also a connection from the node for device ID a to the node for user ID 3. This connection is also associated with the user ID 3.

The connections between the node for device ID a and the node for user identity ID 1 have been broken. A connection is provided from the node for user ID 1 to the node for user ID 3. The function of this connection is to effectively move any connection associated with the node for user ID 1 to the node for the user ID 3.

All the connections between the nodes associated with the third ID KPID3 in the merged set of nodes are now associated with the ID 3.

Reference is now made to FIGS. 5a to d.

Figure 5A:
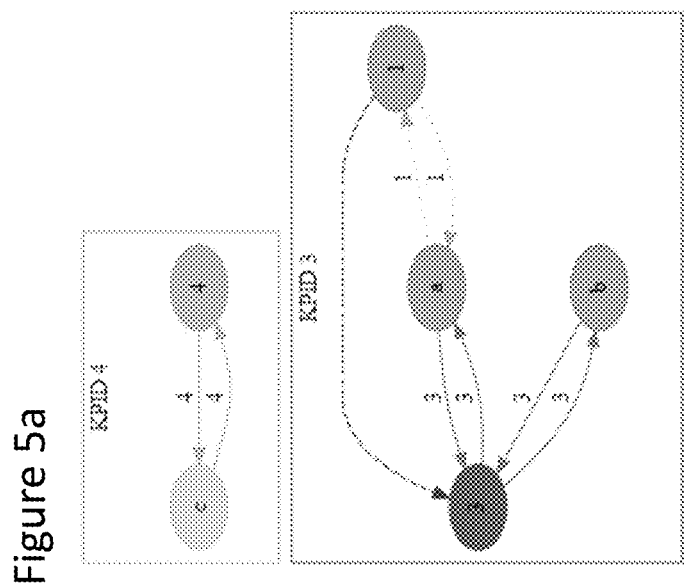
FIG. 5a shows another example of sets of nodes for two identities.

In FIG. 5a, there is a set of nodes for the identity KPID 3 which is as described in relation to FIG. 4b.

In FIG. 5a, there is a set of nodes for the identity KPID 4. In this set of nodes, a node for user ID 4 is connected to a node for device ID c. These two identities are associated with a single user identity which is referred to as KPID 4. The user ID 4 may be a strong identifier.

There is a connection from the node for user ID 4 to the node for device ID c. This connection is associated with the user identity ID 4. There is also a connection from the node for device ID c to the node for user ID 4. This connection is also associated with the user identity ID 4.

Figure 5B:
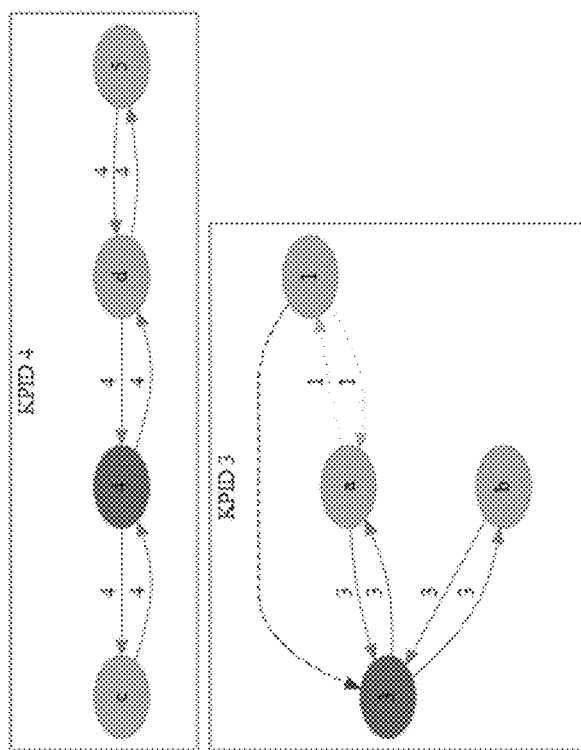

In FIG. 5b, two nodes are added. The first node is for device ID d. The second node is for user ID 5. These nodes are associated with the user identity KPID 4.

The node for device ID d is connected to the node for device ID 4. There is a connection from the node for user ID 4 to the node for device ID d. This connection is associated with the user identity ID 4. There is also a connection from the node for device ID d to the node for user ID 4. This connection is associated with the user identity ID 4.

The node for user ID 5 is connected to a node for device ID d. There is a connection from the node for user ID 5 to the node for device ID d. This connection is associated with the user identity ID 4. There is also a connection from the node for device ID d to the node for user ID 5. This connection is associated with the user identity ID 4.

The set of nodes for the identity KPID 4 thus has been modified to add two further nodes, that is the node for user ID 5 and the node for device d.

Figure 5C:
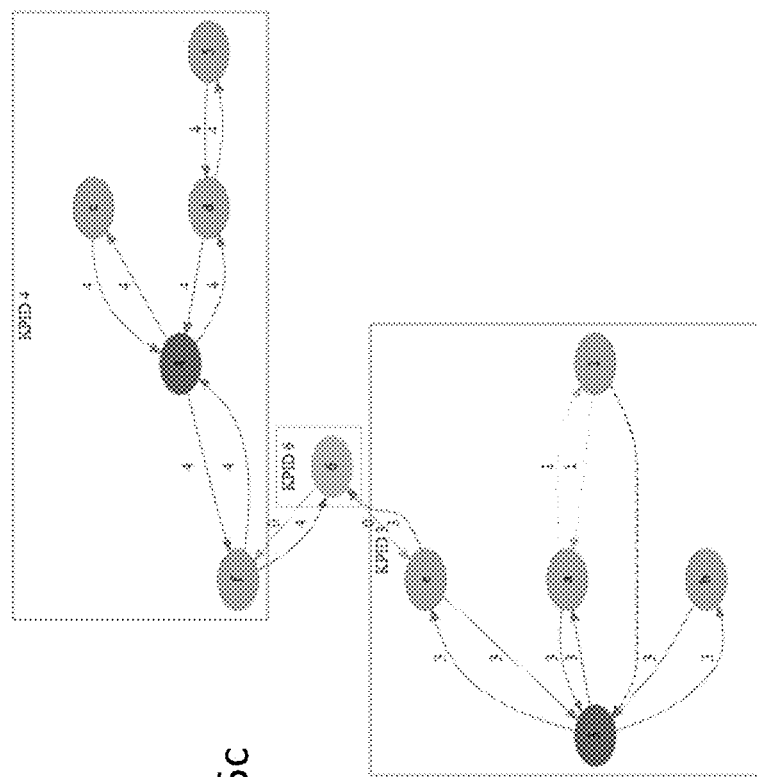
FIG. 5c shows a modification to the set of nodes of FIG. 5b to include one further identity.

In FIG. 5c, there is a modification to the set of nodes for the identity KPID 4.

The set of nodes for the identity KPID 4 has been modified to add one further node. The node for user ID 4 is connected to a node for device ID f. There is a connection from the node for user ID 4 to the node for device ID f. This connection is associated with the user identity ID 4. There is also a connection from the node for device ID f to the node for user ID 4. This connection is also associated with the user identity ID 4.

In FIG. 5c, there is a modification to the set of nodes for the identity KPID 3.

The set of nodes for the identity KPID 3 has been modified to add one further node. The node for user ID 3 is connected to a node for device ID e. There is a connection from the node for user ID 3 to the node for device ID e. This connection is associated with the user identity ID 3. There is also a connection from the node for device ID e to the node for user ID 3. This connection is also associated with the user identity ID 3.

A new user identity which is referred to as KPID 6 is provided. This has a single node which is associated with the user ID 6.

The node for user ID 6 is connected to the node for device ID e associated with the user identity KPID 3. There is a connection from the node for user ID 6 to the node for device ID e. This connection is associated with a default user identity ID 0. There is also a connection from the node for device ID e to the node for user ID 6. This connection is associated with the user identity ID 3.

The node for user ID 6 is connected to the node for device ID f associated with the user identity KPID 4. There is a connection from the node for user ID 6 to the node for device ID f. This connection is associated with a default user identity ID 0. There is also a connection from the node for device ID f to the node for user ID 6. This connection is associated with the user identity ID 4.

User ID 6 is provided in a separate set of nodes as the node is an equal distance from the strong ID, user ID 4 and the strong ID, user ID3.

Figure 5D:
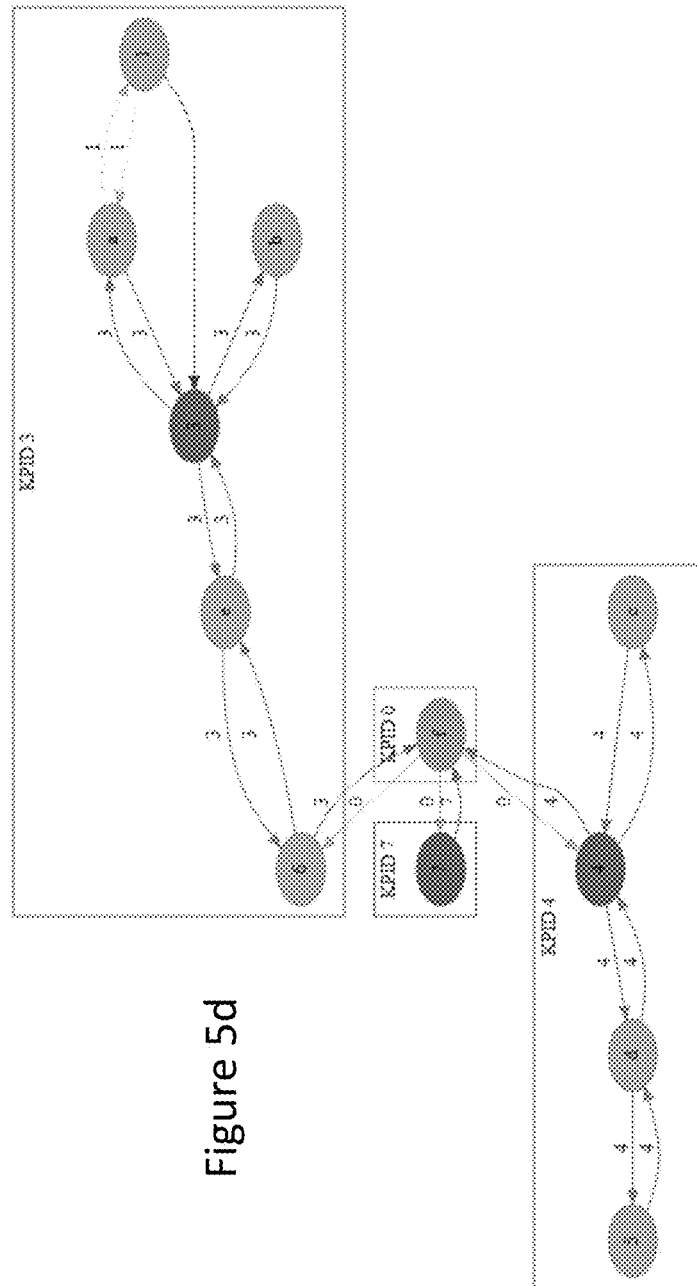

Reference is made to FIG. 5d.

The set of nodes for the identity KPID 3 has been modified to add the node for user ID 6. It is determined that user ID 6 is related to user ID 3. The node for user ID 6 is connected to the node for device ID e. There is a connection from the node for user ID 6 to the node for device ID e. This connection is associated with the user identity ID 3. There is also a connection from the node for device ID e to the node for user ID 6. This connection is also associated with the user identity ID 3.

Thus, the connections between the device ID e and the user ID 6 are updated to both be associated with ID 3.

The set of nodes of KPID 3 has been modified to remove the node associated with device ID f. By moving the user ID 6 to the set of nodes for KPID 3, this means that device ID is associated with two different user IDs. The node associated with device ID f is now associated with the default id, KPID 0. The node for user ID 4 is still connected to a node for device ID f. There is a connection from the node for user ID 4 to the node for device ID f. This connection is associated with the user identity ID 4. There is also a connection from the node for device ID f to the node for user ID 4. This connection is associated with the user identity ID 0.

The node for user ID 6 is connected to the node for device ID f. There is a connection from the node for user ID 6 to the node for device ID f. This connection is associated with the user identity ID 3. There is also a connection from the node for device ID f to the node for user ID 6. This connection is associated with the user identity ID 0.

A new user identity which is referred to as KPID 7 is provided. This has a single node which is associated with the user ID 7.

The node for user ID 7 is connected to a node for device ID f. There is a connection from the node for user ID 7 to the node for device ID f. This connection is associated with the user identity ID 7. There is also a connection from the node for device ID f to the node for user ID 7. This connection is associated with the user identity ID 0.

It should be appreciated that device ID f is associated with two different strong identities, ID 4 and ID7. Accordingly, the node associated with device ID f is provided in a separate set of nodes.

Figure 6:
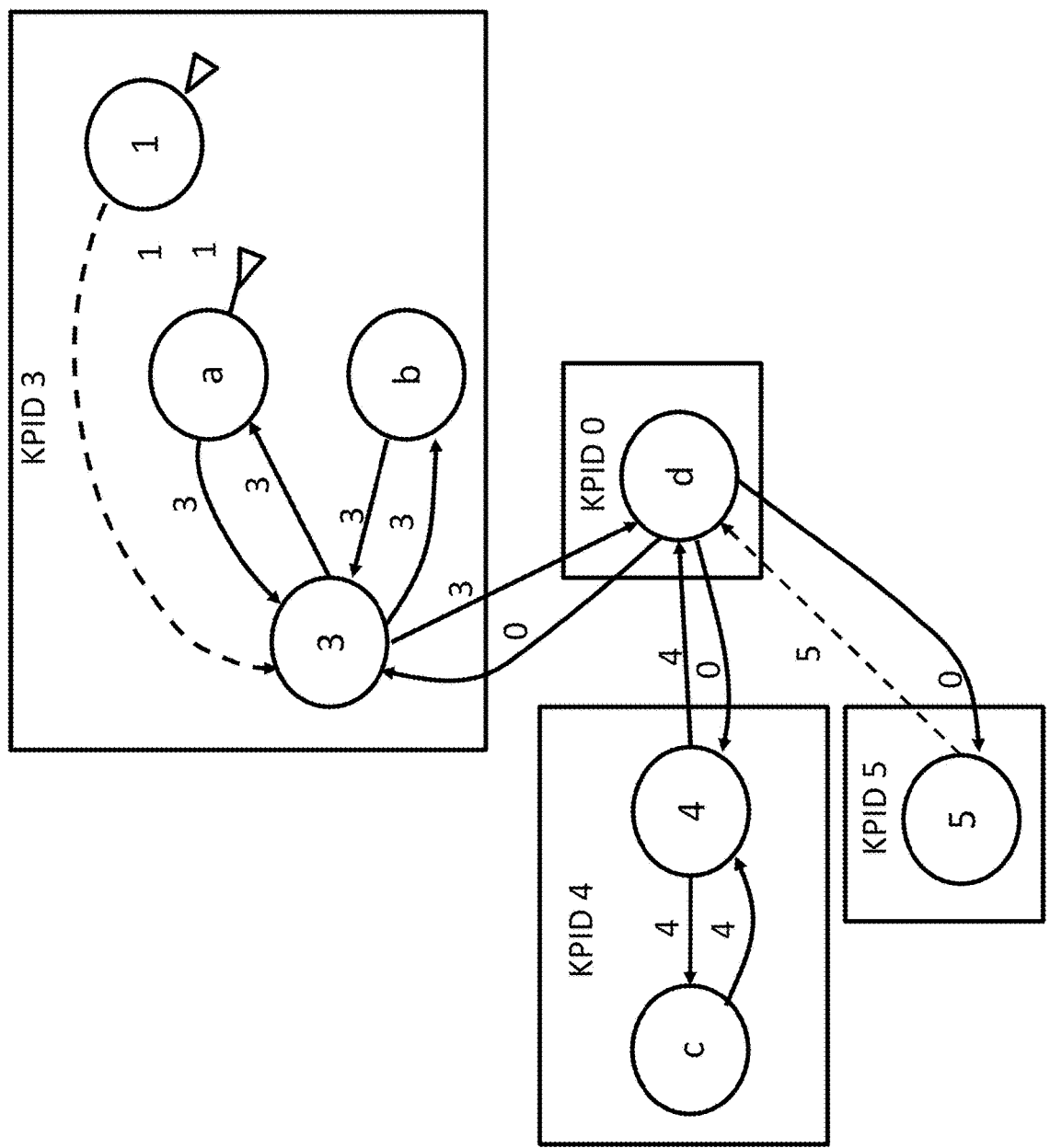
FIG. 6 shows a modification to the set of nodes of FIG. 5a to include two further identities.

Reference is made to FIG. 6 where two nodes are added as compared to FIG. 5a. This shows an alternative scenario to that of FIG. 5b. The first node is for device ID d. This node is initially associated with a default identity KPID 0. The second node is for user ID 5. This node is initially associated with the user identity KPID 5.

The node for device ID d is connected to the node for device ID 4. There is a connection from the node for user ID 4 to the node for device ID d. This connection is associated with the user identity ID 4. There is also a connection from the node for device ID d to the node for user ID 4. This connection is associated with the user identity ID 0.

The node for user ID 3 is connected to a node for device ID d. There is a connection from the node for user ID 3 to the node for device ID d. This connection is associated with the user identity ID 3. There is also a connection from the node for device ID d to the node for user ID 3. This connection is associated with the user identity ID 0.

As can be seen, the connections associated with device ID d are associated with user ID 3, user ID 4 and user ID 5. Accordingly, this device ID d is provided in a separate set of nodes. ID 3 and ID 4 are strong, and ID 5 is weak.

The node for user ID 5 is connected to a node for device ID d. There is a connection from the node for user ID 5 to the node for device ID d. This connection is associated with the user identity ID 5. There is also a connection from the node for device ID d to the node for user ID 5. This connection is associated with the user identity ID 0.

Figure 7A:
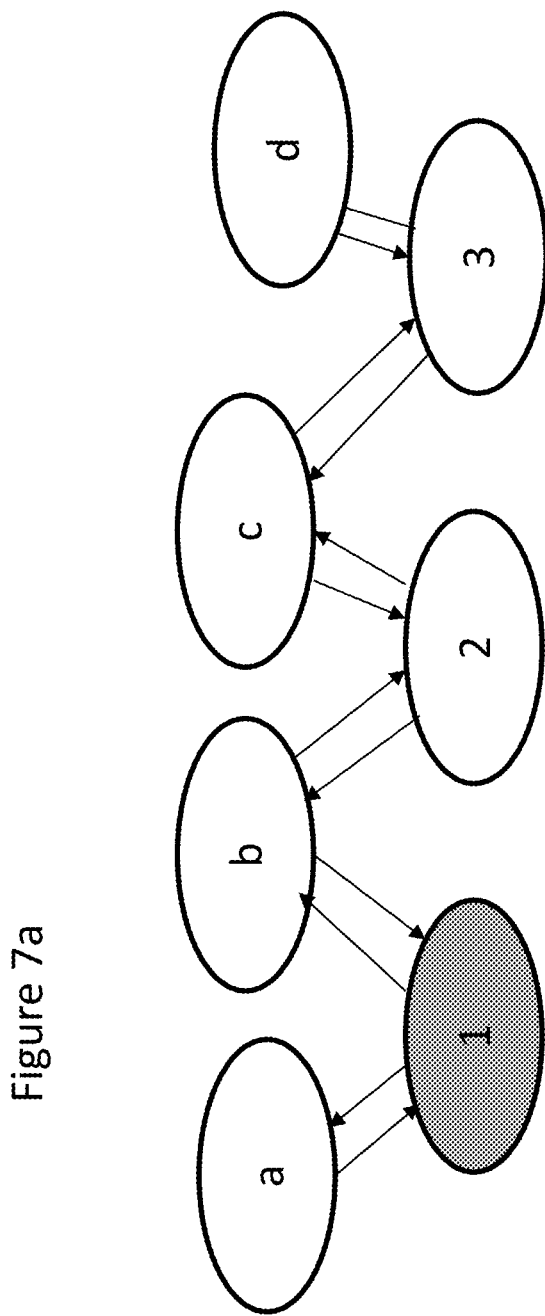
FIG. 7a shows another example of a set of nodes.

Reference is now made to FIG. 7a which shows a node for user ID 1 associated with a node for device ID a and a node for device ID b. A node for user ID 2 is associated with the node for device ID b and a node for device ID c. A node for user ID 3 is associated with the node for device ID c and a node for device ID d. In this case, user ID 1 is a strong identity. Accordingly, all of these identities are associated with user ID 1.

Figure 7B:
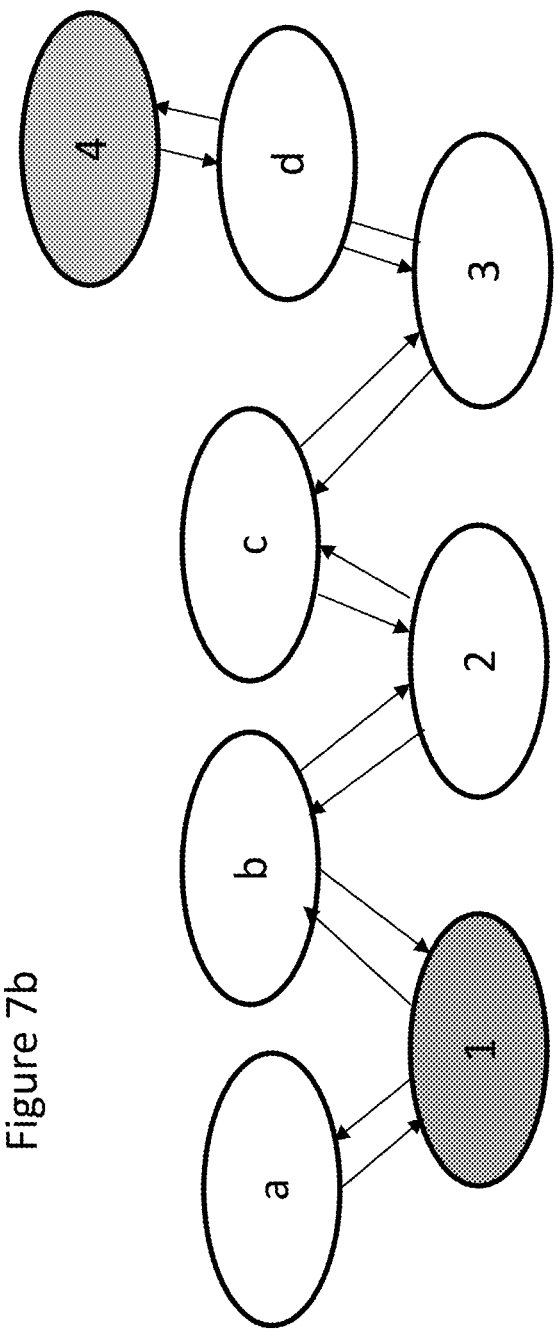
FIG. 7b shows the adding of another node to the set of FIG. 7a causes the breaking of the set of nodes into two.

Reference is made to FIG. 7b which shows the nodes of FIG. 7a. Additionally, a node for user ID 4 has been added and is associated with the node for device d. In this example, the user ID 4 is also a strong identity. Accordingly, the set shown in FIG. 7a needs to be broken into two sets, one associated with user ID 1 and one associated with user ID 4.

In this embodiment, the sets are broken up based on the distance from the node associated with the strong identity. Accordingly, the nodes associated with device ID a and b and the user IDs 1 and 2 would be in one set associated with the user ID 1. The nodes associated with user IDs 3 and 4 and device d would be in one set associated with user ID 4. The node associated with device ID c may be provided in a set associated with a default device ID.

Figure 7C:
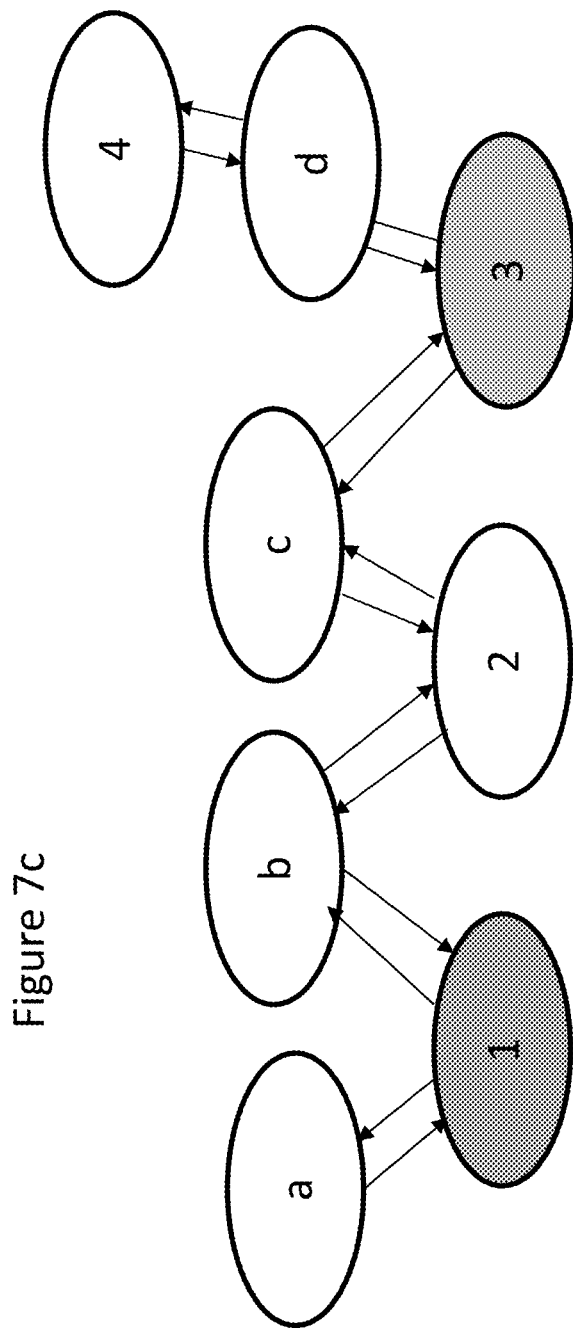
FIG. 7c shows the breaking of the set of FIG. 7a into two when a second strong identity is the set.

Reference is made to FIG. 7c which shows the nodes of FIG. 7a. Additionally, a node for user ID 4 has been added and is associated with the node for device d. In this example, the user ID 3 is now determined to be a strong identity. Accordingly, the set shown in FIG. 7a needs to be broken into two sets, one associated with user ID 1 and one associated with user ID 3.

In this embodiment, the sets are again broken up based on the distance from the node associated with the strong identity. Accordingly, the nodes associated with device ID a and b and the user ID 1 and 2 would be in one set associated with the user ID 1. The nodes associated with user IDs 3 and 4 and device IDs c and d would be in one set associated with user ID 3. The node associated with user ID 2 may be provided in a set associated with user ID 2.

Figure 8:
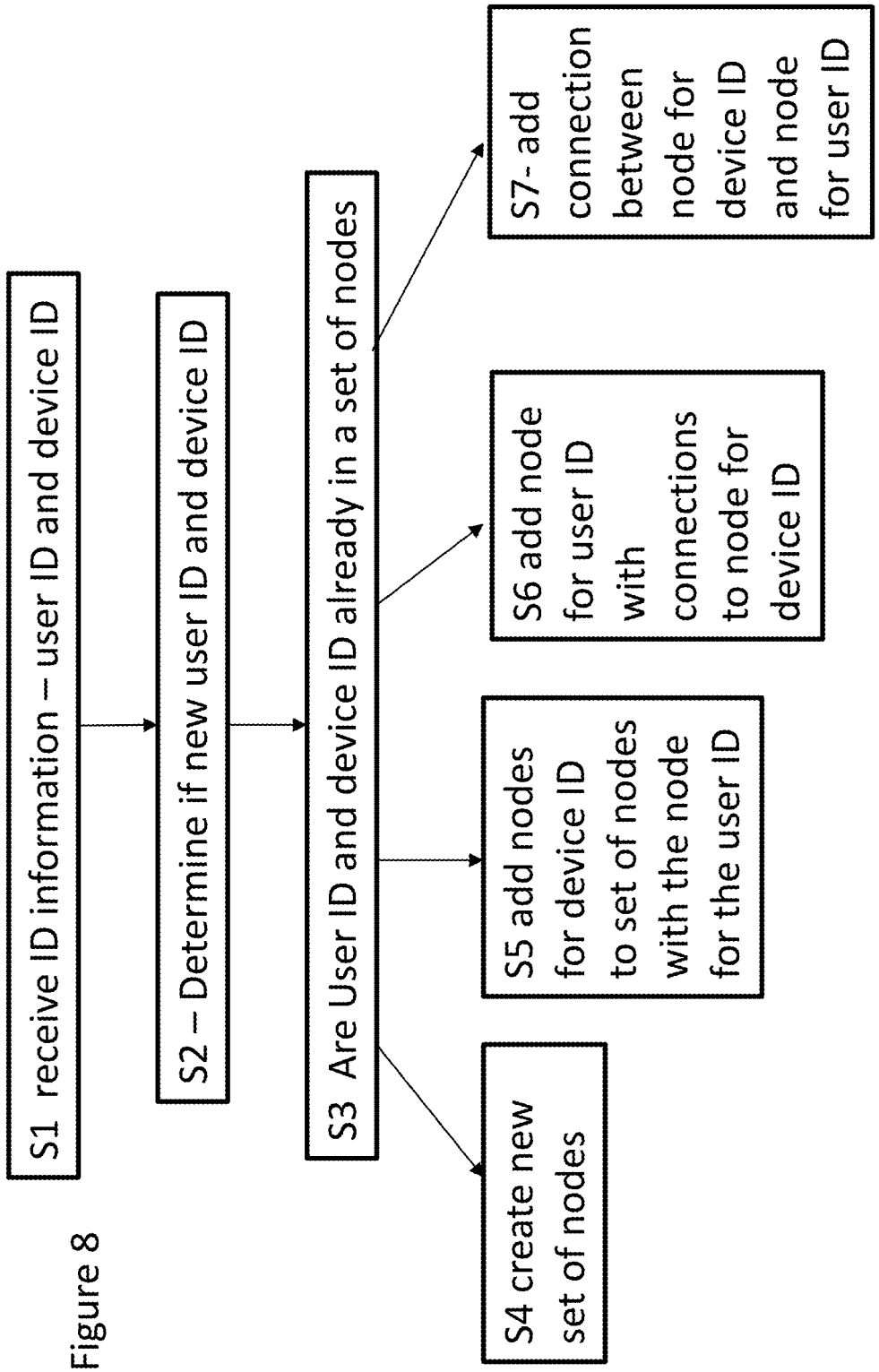
FIG. 8 depicts a flowchart of a method according to some embodiments.

A method of some embodiments will now be described with reference to FIG. 8.

In step S1, ID information is received. This ID information comprises a user ID and a device ID. In some embodiments, there may be more than one user ID. This may be the case where an event occurs during the running of the app which requires the input by the user of identity information. This may for example be a Facebook connect or the registration of the user.

In step S2, a determination is made as to whether this is a new combination of user ID and device ID.

If this is not a new combination, then the next step will be step S1.

If it is a new combination, in step S3, it is determined if the user ID is already in a set of nodes and if the device ID is already in a set of nodes and connected.

In the user ID and the device ID are not in any set of nodes, a new set of nodes is created for the user ID and the device ID in step S4.

If the user ID is already in a set of nodes and the device ID is not in any set of nodes, then in step S5 a node is added to the set of nodes for the device and connections are added to the set of nodes between the node for the device ID and the node for the user ID.

If the user ID is not already in the set of nodes and the device ID is in a set of nodes, then in step S6 a node for the user ID will be provided with a connection to the device ID. A determination is made as to whether the node for the user ID is to be in the same set of nodes as the device ID or in its own set of nodes. This may depend on if the user ID is weak or strong and/or if there is a strong user ID in the set of nodes to which the device ID is connected. In some embodiments, a set of nodes may only have one strong ID. In some embodiments, a determination may be made as to whether the node for the device ID is to be moved to a different set of nodes. This may be the case where that node for the device ID is connected directly to two or more nodes associated with different strong user IDs.

If a node for the user ID is already in a set of nodes and the device ID is in a set of nodes, but not connected together, then in step S7 a connection may be made between the nodes. This may require moving of or more of the user ID node and the device ID node into one or more different set of nodes.

Figure 9:
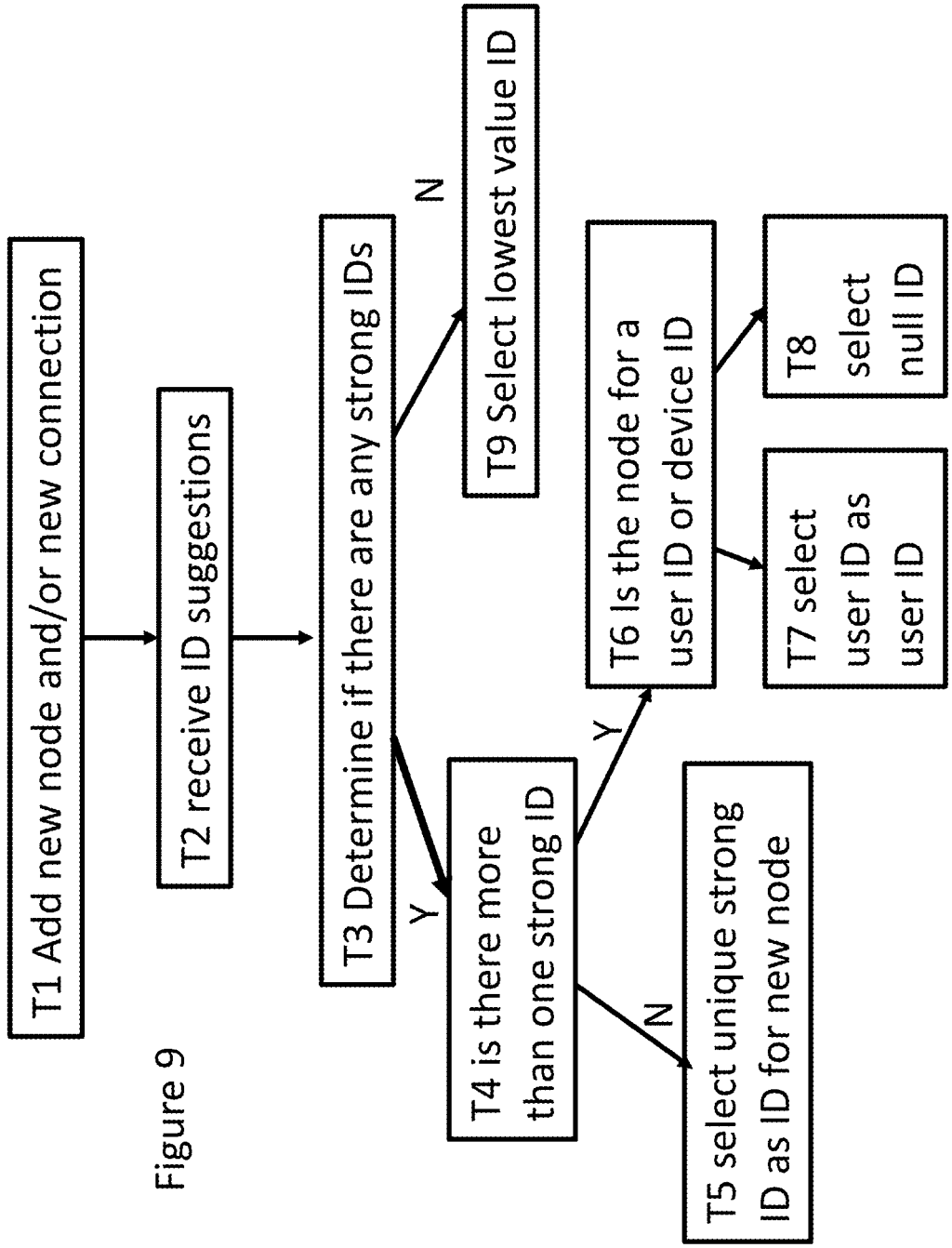
FIG. 9 shows a flowchart of another method of some embodiments.

Reference is made to FIG. 9 which shows a method of some embodiments.

In T1 a new node is added and/or a new connection is added. The node may be a device node or a user node.

In step T2, suggestions for an ID will be received from neighbouring nodes. A neighbouring node will be a node to which the node is question is connected. In some embodiments, the neighbouring nodes may be directed connected nodes. In other embodiments, the neighbouring nodes may additionally comprise indirectly connected nodes. One or more candidate ones of the sets of nodes to which a new ID to be added may be determined.

In step T3, a determination is made as to whether there are any strong IDs. If so then the next step is step T4.

In step T4, it is determined if there is more than on strong ID.

If there is only one strong ID, then the next step is step T5 where the unique strong ID is selected. The new node will be added to the set of nodes for the selected ID. The new node may be added to the candidate one of the sets of nodes of the strong ID.

If it is determined if there is more than on strong ID in step T4, then the next step is step T6.

In step T6 it is determined if the node is for a user ID or a device ID.

If the node is for a user ID, then the next step is step T7.

In step T7, the user ID of the node is selected as the user ID. The new node will be in a new set for the selected ID.

If the node is for a device ID, then the next step is step T8.

In step T8, a default ID, such as a null ID, is selected as the device ID. The new node will be in a set for the selected ID.

Going back to step T3. If in step T3, a determination is made that there are no strong IDs, then the next step is step T9. In step T9, a criterion is applied to select the user ID. For example, the user ID having the lowest value user ID is selected as the user ID. In other embodiments, one or more different criteria may be applied. The new node will be added to the set of nodes for the selected ID. The new node may be added to the candidate one of the sets of nodes of the selected ID.

Figure 10:
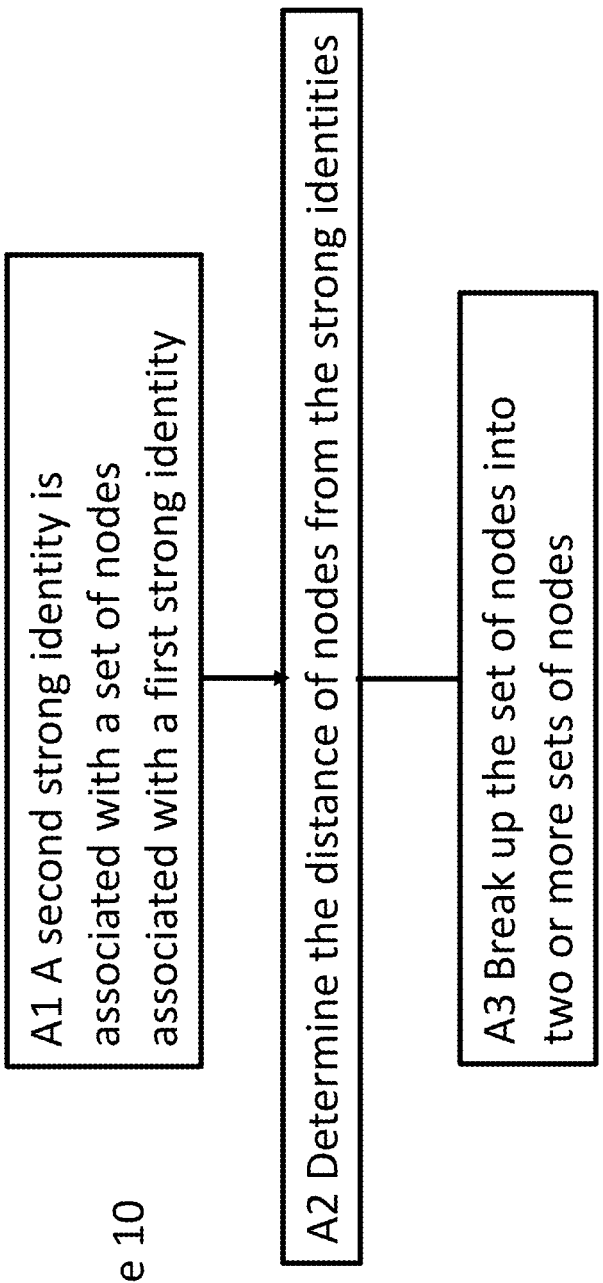
FIG. 10 shows a flowchart of another method of some embodiments.

In some embodiments, a set of nodes may be only permitted to have one strong ID. If a second strong ID is added to the set of nodes, that set of nodes will be broken up into two or more set of nodes with the strong IDs being in different set of nodes. An example of such a method is shown in FIG. 10.

In step A1, it is determined that a second strong identity is associated with a set of nodes which is associated with a first strong identity. This may be as a result of a new identity being received which is related to another identity in the set of nodes or as a result of a strong identity being associated with an identity which was previously considered to be weak.

In step A2, the distance of nodes from the two strong identity nodes is determined.

In step A3, the set of nodes is broken into two or more sets. Those nodes which are closer to the node associated with the first strong identity are in the set associated with the first identity and the nodes which are closer to the node associated with the second strong identity are in a set associated with the second strong identity. If there are one or more nodes which are equal distance from the two strong identity nodes, then that node may be put in a set on its own. Alternatively, a different criteria may be applied to determine which set the equidistant node is placed. For example, this may be dependent on the type of strong ID.

In other embodiments, a set of nodes may be permitted to have more than one strong ID.

In some embodiments, one or more nodes may be connected to two or more different set of nodes. In some embodiments, a determination is made as to how close the node is to a strong identifier in each graph node. This may be expressed by a number of nodes between the node in question and the respective nodes with the strong IDs. This determination is used to determine which set of nodes a given node is to belong to. This can be its own set of nodes or one or other of the set of nodes associated with the strong identity. Generally, a node will be associated with the set of nodes where there is the shortest distance to the node associated with the strong identity.

A node which is directly connected to two or more nodes associated with a strong identity will generally be provided in its own set of nodes.

In some embodiments, there may be a limit on the number of nodes in a graph.

In some embodiments, there may be a limit on the number of device nodes and/or user ID nodes in a set of nodes.

In some embodiments, there may be a limit on the depth of a set of nodes. This may be expressed in the greatest permitted distance between two nodes in the same set of nodes and/or as the greatest permitted distance between a node and the node associated with the strong ID.

In some embodiments, as data is received the set of nodes are iteratively updated.

The set of nodes data may be used to provide an indication of a number of active users.

This may be used for network planning to determine the number of servers etc required.

If a service provider provides different services (for example games) the user ID for a single person might be different in these for different reasons. For example, the user IDs are being generated without network connectivity, or are generated before the user enters user details like username, email, password etc. There is the aspect where players change device used with the service. This may necessitate a reinstall of the software, and this may result in a new user ID. On some platforms there exists the possibility to reset application data, and this could cause a new user ID to be created.

The set of nodes data may be used to consolidate information associated with a user. For example, this may link the accounts of a user. This may allow progress made using one account of the user to update the progress in another account of the user. Alternatively or additionally this may be used to control the content presented to a user to prevent the same content being presented to the same user.

Some embodiments may be used to attribute device identifiers to users.

In some embodiments, the associated identifiers can be used to cause two or more accounts to be linked.

The data associated with the linked accounts may be processed to provide consolidated app data. In the context of game data, this may comprise consolidating game progress data, for example.

In some embodiments, the associated identifiers can be used to cause two or more accounts to be linked where those accounts are associated with different computer apps such as different computer games.

It should be emphasised that the node representation has been used when explaining various different embodiments. Some embodiments may use this node representation in the data used to define these sets. However in other embodiments, the data defining the sets of data may be stored without using the node representation.

Various methods and devices have been described. It should be appreciated that these methods may be implemented in apparatus or devices comprising any suitable circuitry. Some embodiments may be implemented by at least one memory and at least one processor.

The memory is provided by memory circuitry and/or the processor is provided by processor circuitry. Some embodiments may be provided by a computer program running on the at least one processor. The computer program may comprise computer implemented instructions which are stored in the at least one memory and which may be run on the at least one processor.

An appropriately adapted computer program code product or products may be used for implementing the embodiments, when loaded on an appropriate data processing apparatus. The program code product for providing the operation may be stored on, provided, and embodied by means of an appropriate carrier medium. An appropriate computer program can be embodied on a computer readable record medium. A possibility is to download the program code product via a data network.

In general, the various embodiments may be implemented in hardware or special purpose circuits, software, logic, or any combination thereof.

Embodiments may thus be practiced in various components such as integrated circuit modules.

It is also noted herein that while the above describes embodiments of the invention, there are several variations and modifications which may be made to the disclosed solution without departing from the scope of the present invention.

The invention claimed is:

1. A computing arrangement, the computing arrangement configured to determine relationships between identity data, the computing arrangement comprising:
    an input configured to receive data, the data being provided by one or more computer game apps running on one or more computer devices, the data provided by a respective computer game app comprising user identity data and associated computer device identity data;
    at least one memory configured to store a plurality of sets of identity data, a respective set of identity data being associated with a user identity, wherein a first set of identity data comprises at least one user identity data, at least one computer device identity data and information defining connection relationships between different identity data of the first set of identity data, wherein each identity data of the first set of identity data is connected directly or indirectly to each of other identity data of the first set of identity data, the first set of identity data comprising at least two identity data which are indirectly connected via one or more other identity data of the first set; and
    at least one processor configured to:
    determine for the first set of identity data, a largest connection distance between two identity data in the first set of identity data which are indirectly connected, a connection distance between two identity data being determined using the information defining the connection relationships;
    determine that the largest connection distance is greater than a threshold distance; and
    in response, divide the first set of identity data into two or more sets of identity data.

2. The computing arrangement as claimed in claim 1, wherein the at least one processor is configured to determine in response to receiving second user identity data and associated device identity data from a respective computer game app, that the first set of identity data which is associated with a first strong user identity is to be divided into two or more sets of identity data.

3. The computing arrangement as claimed in claim 2, wherein at least one of the received second user identity and associated second device identity is associated with one or more of the identity data of the first stored set of identity data and the second user identity is a strong user identity, a second set of user identity data associated with the second strong user identity.

4. The computing arrangement as claimed in claim 1, wherein when new identity data is received, the at least one processor is configured to determine if the new identity data is to be added to one of the stored plurality of sets of identity data or if the new identity data is to be added to a new set of identity data.

5. The computing arrangement as claimed in claim 1, wherein when new identity data is received, the at least one processor is configured to determine which one of the stored plurality of sets of identity data the new identity data is to be added.

6. The computing arrangement as claimed in claim 5, wherein when the new identity data is received with identity data which has previously been received, the at least one processor is configured to provide connection relationship information between the new identity data and the identity data which have previously been received.

7. The computing arrangement as claimed in claim 5, wherein the at least one processor is configured to determine one or more candidate ones of the plurality of sets of data to which the new identity data is to be added.

8. The computing arrangement as claimed in claim 7, wherein the at least one processor is configured to determine a type of the new identity data and in dependence on the determined type of the new identity data, select one of the candidate ones of the plurality of sets of data.

9. The computing arrangement as claimed in claim 7, wherein the at least one processor is configured to select one of the candidate ones of the plurality of sets of data in dependence on a connection distance determined using the information defining connection relationships between an identity of a given type in a respective candidate one of the plurality of sets of identity data and the new identity data.

10. The computing arrangement as claimed claim 1, wherein each identity data is represented programmatically by a node with one or more connections provided between nodes representing a respective connection relationship.

11. The computing arrangement as claimed in claim 1, wherein the at least one processor is configured to determine when the number of identity data in a set of the plurality of sets of data has reached a threshold number and in response to divide that set into two or more sets of identity data.

12. The computing arrangement as claimed in claim 1, wherein at least one of the identity data is associated with an account to play one or more of the computer game apps, the at least one processor being configured to link together accounts which are associated with identities in a same one of the plurality of sets of identity data.

13. A computer implemented method provided by a computing arrangement, the computing arrangement configured to determine relationships between identity data, the computing arrangement comprising an input, at least one memory and at least one processor which are configured to provide the method which comprises:
- receiving data by the input, the data being provided by one or more computer game apps running on one or more computer devices, the data provided by a respective computer game app comprising user identity data and associated computer device identity data;
- storing by the at least one memory a plurality of sets of identity data, a respective set of identity data being associated with a user identity, wherein a first set of identity data comprises at least one user identity data, at least one computer device identity data and information defining connection relationships between the different identity data of the first set of identity data, wherein each identity data of the first set of identity data is connected directly or indirectly to each of other identity data of the first set of identity data, the first set of identity data comprising at least two identity data which are indirectly connected via one or more other identity data of the first set;
- determining, by the at least one processor, for the first set of identity data, a largest connection distance between two identity data in the first set of identity data which are indirectly connected, a connection distance between two identity data being determined using the information defining the connection relationships;
- determining, by the at least one processor, that the largest connection distance is greater than a threshold distance; and
- in response, by the at least one processor, dividing the first set of identity data into two or more sets of identity data.

14. The method as claimed in claim 13, comprising determining in response to receiving second user identity data and associated device identity data from a respective computer game app, that the first set of identity data which is associated with a first strong user identity is to be divided into two or more sets of identity data.

15. The method as claimed in claim 14, wherein at least one of the received second user identity and associated second device identity is associated with one or more of the identity data of the first stored set of identity data and the second user identity is a strong user identity, a second set of user identity data associated with the second strong user identity.

16. The method as claimed in claim 13, comprising, when new identity data is received determining if the new identity data is to be added to one of the stored plurality of sets of identity data or if the new identity data is to be added to a new set of identity data.

17. The method as claimed in claim 16, comprising determining a type of the new identity data and in dependence on the determined type of the new identity data, select one of a plurality of candidate ones of the plurality of sets of data.

18. The method as claimed in claim 16, comprising selecting, for the new identity data, one of a plurality of candidate ones of the plurality of sets of data in dependence on a connection distance determined using the information defining connection relationships between an identity of a given type in a respective candidate one of the plurality of sets of identity data and the new identity data.

19. The method as claimed in claim 13, wherein each identity data is represented programmatically by a node with one or more connections provided between nodes representing a respective connection relationship.

20. A non-transitory computer readable storage device storing instructions that, when executed by at least one processor of computing arrangement comprising at least one memory, the at least one processor, and an input causes the computing arrangement to be configured to determine relationships between identity data, the at least one processor being configured to perform the following steps:
- causing the input to receive data, the data being provided by one or more computer game apps running on one or more computer devices, the data provided by a respective computer game app comprising user identity data and associated computer device identity data;
- causing the at least one memory to store a plurality of sets of identity data, a respective set of identity data being associated with a user identity, wherein a first set of identity data comprise at least one user identity data, at least one computer device identity data and information defining connection relationships between the different identity data of the first set of identity data, wherein each identity data of the first set of identity data is connected directly or indirectly to each of other identity data of the first set of identity data, the first set of identity data comprising at least two identity data which are indirectly connected via one or more other identity data of the first set;
- determining for the first set of identity data, a largest connection distance between two identity data in the first set of identity data which are indirectly connected, a connection distance between two identity data being determined using the information defining the connection relationships;
- determining that the largest connection distance is greater than a threshold distance; and
- in response, dividing the first set of identity data into two or more sets of identity data.

* * * * *